United States Patent
Maltsev et al.

(10) Patent No.: US 9,397,740 B2
(45) Date of Patent: Jul. 19, 2016

(54) MODULAR ANTENNA ARRAY WITH RF AND BASEBAND BEAMFORMING

(71) Applicant: Intel Corporation, Santa Clara, CA (US)

(72) Inventors: Alexander Maltsev, Nizhny Novgorod (RU); Ali S. Sadri, San Diego, CA (US); Richard B. Nicholls, Portland, OR (US); Reza Arefi, Great Falls, VA (US); Alexei Davydov, Nizhny Novgorod (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 13/994,223

(22) PCT Filed: Dec. 10, 2012

(86) PCT No.: PCT/IB2012/003075
§ 371 (c)(1),
(2) Date: Jun. 14, 2013

(87) PCT Pub. No.: WO2014/091274
PCT Pub. Date: Jun. 19, 2014

(65) Prior Publication Data
US 2015/0288438 A1    Oct. 8, 2015

(51) Int. Cl.
*H04B 1/00* (2006.01)
*H04B 7/06* (2006.01)
(Continued)

(52) U.S. Cl.
CPC ............. *H04B 7/0617* (2013.01); *H01Q 1/246* (2013.01); *H01Q 3/40* (2013.01); *H01Q 21/0006* (2013.01); *H01Q 21/205* (2013.01); *H01Q 25/00* (2013.01); *H04L 27/18* (2013.01); *H04W 16/28* (2013.01)

(58) Field of Classification Search
CPC ....... H04B 7/01; H04B 7/0408; H04B 7/0617
USPC ............ 455/73, 67.16, 562.1, 103, 110, 272, 455/277.1, 102
See application file for complete search history.

(56) References Cited

U.S. PATENT DOCUMENTS 3,996,590 A * 12/1976 Hammack ............... G01S 1/302
342/107
5,581,260 A * 12/1996 Newman ................ H04B 7/088
342/372
(Continued)

FOREIGN PATENT DOCUMENTS

RU          2 050 556 C1    12/1995

OTHER PUBLICATIONS

Wikipedia, "Wireless Gigabit Alliance," WiGig MAC and PHY Specification Version 1.1 From Wikipedia, the free encyclopedia, Apr. 2011, retrieved on Mar. 14, 2014, 6 pages.
(Continued)

*Primary Examiner* — Tuan Pham
(74) *Attorney, Agent, or Firm* — Grossman, Tucker, Perreault & Pfleger, PLLC

(57) ABSTRACT

Generally, this disclosure provides systems and methods for a modular antenna array using radio frequency (RF) and baseband (BB) beamforming. A system may include a plurality of antenna modules, each of the antenna modules further including an array of antenna elements coupled to an RF beamforming circuit, the RF beamforming circuit to adjust phase shifts associated with the antenna elements to generate an antenna beam associated with the antenna module; and a central beamforming module coupled to each of the antenna modules, the central beamforming module to control the antenna beam associated with each of the antenna modules and to generate signal adjustments relative to each of the antenna modules, wherein the arrays of antenna elements of the antenna modules combine to operate as a composite antenna beamforming array.

32 Claims, 10 Drawing Sheets

(51) Int. Cl.
*H01Q 3/40* (2006.01)
*H01Q 1/24* (2006.01)
*H01Q 21/00* (2006.01)
*H01Q 21/20* (2006.01)
*H01Q 25/00* (2006.01)
*H04L 27/18* (2006.01)
*H04W 16/28* (2009.01)

(56) References Cited

U.S. PATENT DOCUMENTS

| | | | |
|---|---|---|---|
| 5,923,289 A * | 7/1999 | Buer | H01Q 3/2605 342/368 |
| 6,823,174 B1 * | 11/2004 | Masenten et al. | 455/63.4 |
| 7,433,322 B1 | 10/2008 | Alapuranen | |
| 7,453,946 B2 | 11/2008 | Sondur | |
| 7,787,567 B2 | 8/2010 | Sutskover | |
| 7,884,776 B2 | 2/2011 | Mohamadi | |
| 2004/0043795 A1 | 3/2004 | Zancewicz | |
| 2004/0235528 A1 | 11/2004 | Korisch | |
| 2005/0122257 A1 | 6/2005 | Rowe et al. | |
| 2006/0040615 A1 | 2/2006 | Mohamadi | |
| 2007/0205955 A1 | 9/2007 | Korisch et al. | |
| 2007/0210960 A1 | 9/2007 | Rofougaran | |
| 2010/0328157 A1 | 12/2010 | Culkin et al. | |
| 2011/0064033 A1 * | 3/2011 | Gong | H04B 7/0617 370/329 |
| 2011/0291891 A1 | 12/2011 | Nsenga et al. | |
| 2012/0033761 A1 * | 2/2012 | Guo et al. | 375/316 |
| 2012/0034952 A1 | 2/2012 | Lo et al. | |
| 2012/0235881 A1 | 9/2012 | Pan et al. | |
| 2012/0256805 A1 | 10/2012 | Orihashi | |
| 2012/0280861 A1 | 11/2012 | Kishimoto et al. | |
| 2012/0309331 A1 | 12/2012 | Yehezkely et al. | |
| 2013/0027250 A1 * | 1/2013 | Chen | G01S 3/56 342/368 |
| 2013/0308717 A1 | 11/2013 | Maltsev et al. | |
| 2014/0203969 A1 | 7/2014 | Maltsev et al. | |
| 2014/0210666 A1 | 7/2014 | Maltsev et al. | |
| 2014/0357319 A1 | 12/2014 | Maltsev et al. | |

OTHER PUBLICATIONS

International Search Report and Written Opinion received for PCT Patent Application No. PCT/IB2012/003075, mailed on Aug. 15, 2013, 7 pages.

International Search Report and Written Opinion received for PCT Patent Application No. PCT/RU2012/001098, mailed on Sep. 19, 2013, 7 pages.

International Search Report and Written Opinion received for PCT Patent Application No. PCT/US2014/012202, mailed on Apr. 25, 2014, 12 pages.

International Search Report and Written Opinion received for PCT Patent Application No. PCT/US2014/012659, mailed on May 19, 2014, 12 pages.

Madhow, Upamanyu, "Revisiting MIMO for tiny wavelengths 60 GHz and beyond," Intel Wireless Data Center Research Workshop, Jul. 13, 2012, 38 pages, UCSB, United States.

* cited by examiner

MODULAR ANTENNA ARRAY WITH RF AND BASEBAND BEAMFORMING

FIELD

The present disclosure relates to antenna array beamforming, and more particularly, to a modular architecture for antenna arrays using radio frequency (RF) and baseband beamforming.

BACKGROUND

Electronic devices, such as laptops, notebooks, netbooks, personal digital assistants (PDAs) and mobile phones, for example, increasingly tend to include a variety of wireless communication capabilities operating at increased data rates. The wireless communication systems used by these devices are expanding into the higher frequency ranges of the communication spectrum, such as, for example, the millimeter wave region and, in particular, the 60 GHz band. Propagation losses and attenuation tend to increase at these higher frequencies, however, and it can become difficult to implement antenna systems in a manner that provides the desired gain and spatial coverage.

Communication in this band at distances of approximately 50 meters or more, as for example outdoors or in large spaces, typically requires the use of highly directional antennas with gains of 30-40 dB or more to compensate for the attenuation losses. Additionally, there is often a requirement for relatively wide sector coverage to include other devices and stations regardless of location. Some communication systems employ phased array beamforming to steer a relatively narrow beam in a desired direction, but this approach typically requires a number of antenna elements to be coupled to an RF integrated circuit (RFIC) processing chip, where the gain of the phased array is related to the number of antenna elements. It is, however, generally difficult and expensive to couple a sufficient number of antenna elements to provide the necessary gain since the signal routing (feeding lines) between the antenna elements and the RFIC become too complex and result in increased signal attenuation. The cost of these antenna arrays typically grows disproportionately with the number of antenna elements in the array.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for antenna array beamforming using a modular architecture to synthesize larger composite antenna arrays from smaller sub-array antenna modules. A combination of RF beamforming in the sub-array antenna modules and baseband beamforming between sub-array antenna modules provides increased beamforming capability, for example, in beam width, gain, coverage and beam steering. The system may be configured to operate in the millimeter wave (mm-wave) region of the RF spectrum and, in particular, the 60 GHz region associated with the use of, for example, wireless personal area network (WPAN) and wireless local area network (WLAN) communication systems.

Figure 1:
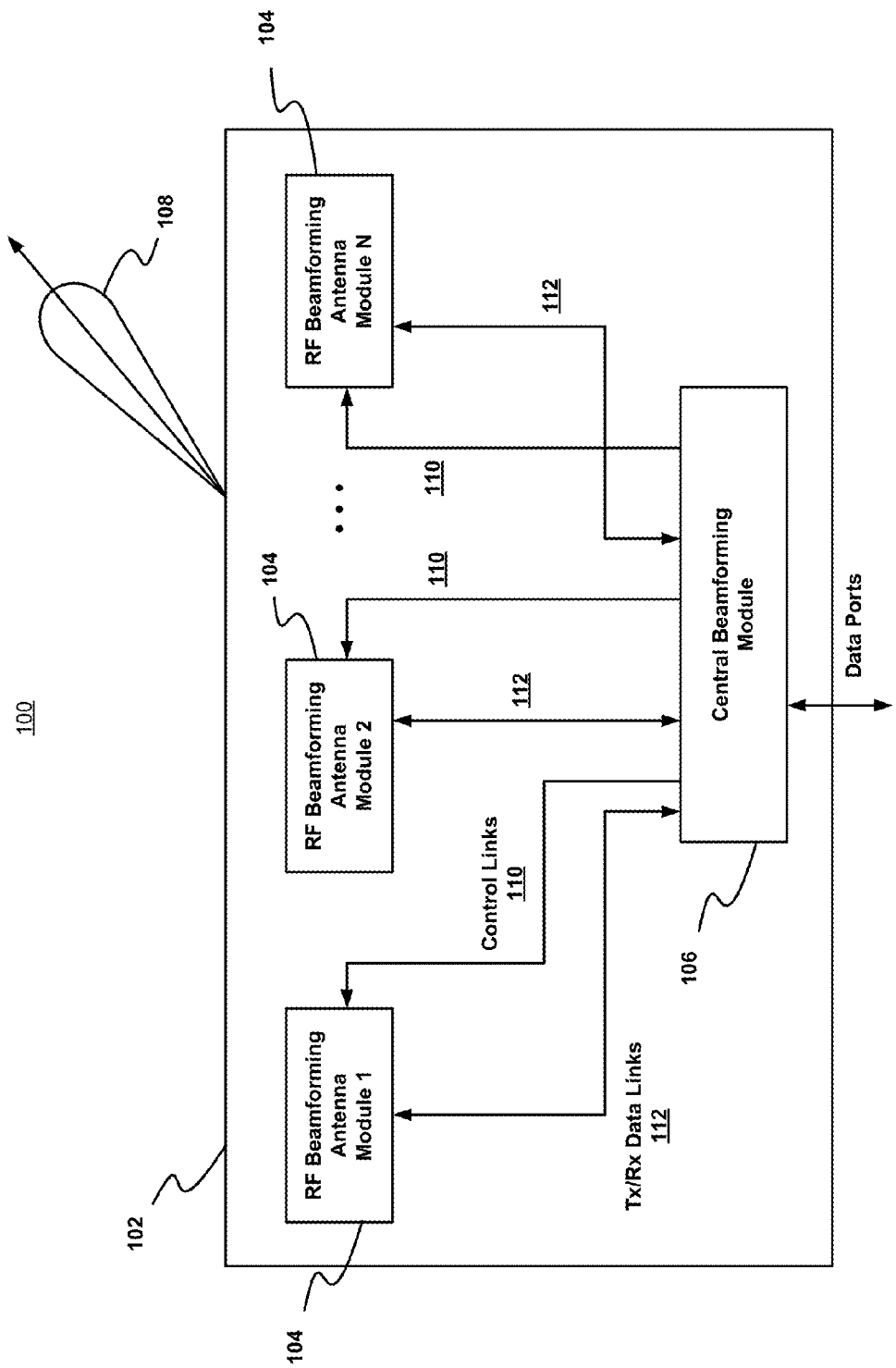
FIG. 1 illustrates a top level system diagram of one exemplary embodiment consistent with the present disclosure.

FIG. 1 illustrates a top level system diagram 100 of one exemplary embodiment consistent with the present disclosure. A modular antenna array system 102 is shown, which may be configured to transmit and/or receive data in the mm-wave region of the RF spectrum. In some embodiments the system 102 may form part of a wireless communication platform, such as, for example, a mobile phone, a laptop, a tablet or a base station. The system 102 may be configured to generate an antenna beam pattern 108, which, in some embodiments, may be a steerable beam. The system 102 may include a plurality of RF beamforming antenna modules 104 coupled to a central beamforming module 106 through transmit (Tx) and receive (Rx) data links 112 and control links 110, the operations of which will be explained in greater detail below. In some embodiments, the central beamforming module 106 may operate at baseband, intermediate frequency (IF) or at RF. The data to be transmitted or received by system 102 may be provided through a data port that couples the central beamforming module 106 to a processor or any other suitable system configured to generate or receive data.

Figure 2:
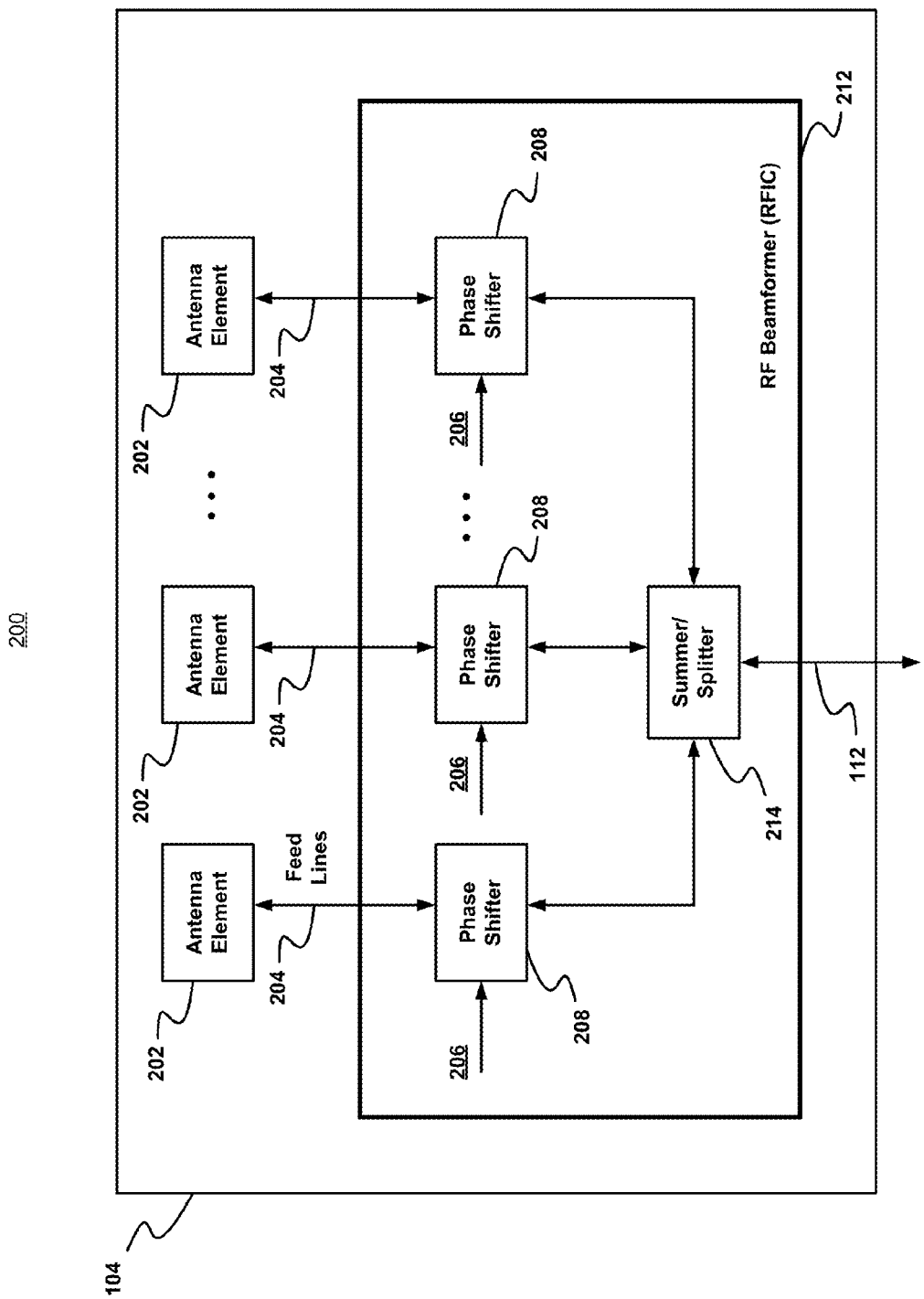
FIG. 2 illustrates a block diagram of one exemplary embodiment consistent with the present disclosure.

FIG. 2 illustrates a block diagram 200 of one exemplary embodiment consistent with the present disclosure. RF beamforming antenna modules 104 are shown to include an array of antenna elements 202 coupled to an RF beamformer RFIC 212 through feed lines 204 which may be micro-strip feed lines. RFIC 212 includes an array of phase shifting circuits 208 coupled to a summer/splitter circuit 214. The phase shifter circuits 208 are configured to adjust the phase of the RF signal received from (or transmitted to) the associated antenna element 202. The amount of the phase shift may be determined by control signals 206 that are supplied to the phase shifter circuits. The control signals 206 may be weighting coefficients that are generated within the RFIC 212 and/or derived from signals on control links 110 received from the central beamforming module 106. The phase shift adjustments may determine and control the beam width, gain and/or direction of the antenna beam formed by the array of antenna elements 202. In the case of a received signal, the summer/splitter circuit 214 sums the received phase shifted signals and provides the sum to the central beamforming module 106 over data links 112. In the case of a transmitted signal, the summer/splitter circuit 214 splits the signal provided from the central beamforming module 106 over data links 112 and couples the split signal to each of the phase shifter circuits 208.

The signals on control links 110 received from the central beamforming module 106, may further adjust the weighting coefficients to cause the RF beamforming antenna modules 104 to perform as a single larger antenna array with increased beamforming capability compared to the individual RF beamforming antenna modules 104, as will be explained in greater detail below. In some embodiments, central beamforming module 106 may divide the available RF beamforming antenna modules 104 into sub-groups where each sub-group may be individually steered to different directions and/or used for different purposes (e.g., different carrier signal frequencies). In some embodiments, the signal being transmitted or received may include multiple frequency components and the central beamforming module may be configured to apply different signal adjustments for each of the multiple frequency components of the signal.

Frequency up-conversion and down-conversion (not shown) may be performed on the transmit and receive signals (respectively) to convert between baseband (or IF) and RF. In a preferred embodiment, the up/down frequency conversion may be performed by a module included in the RFIC 212. In some other embodiments, the frequency conversion may be performed by a module deployed between the RFIC 212 and the central beamforming module 106.

Figure 3:
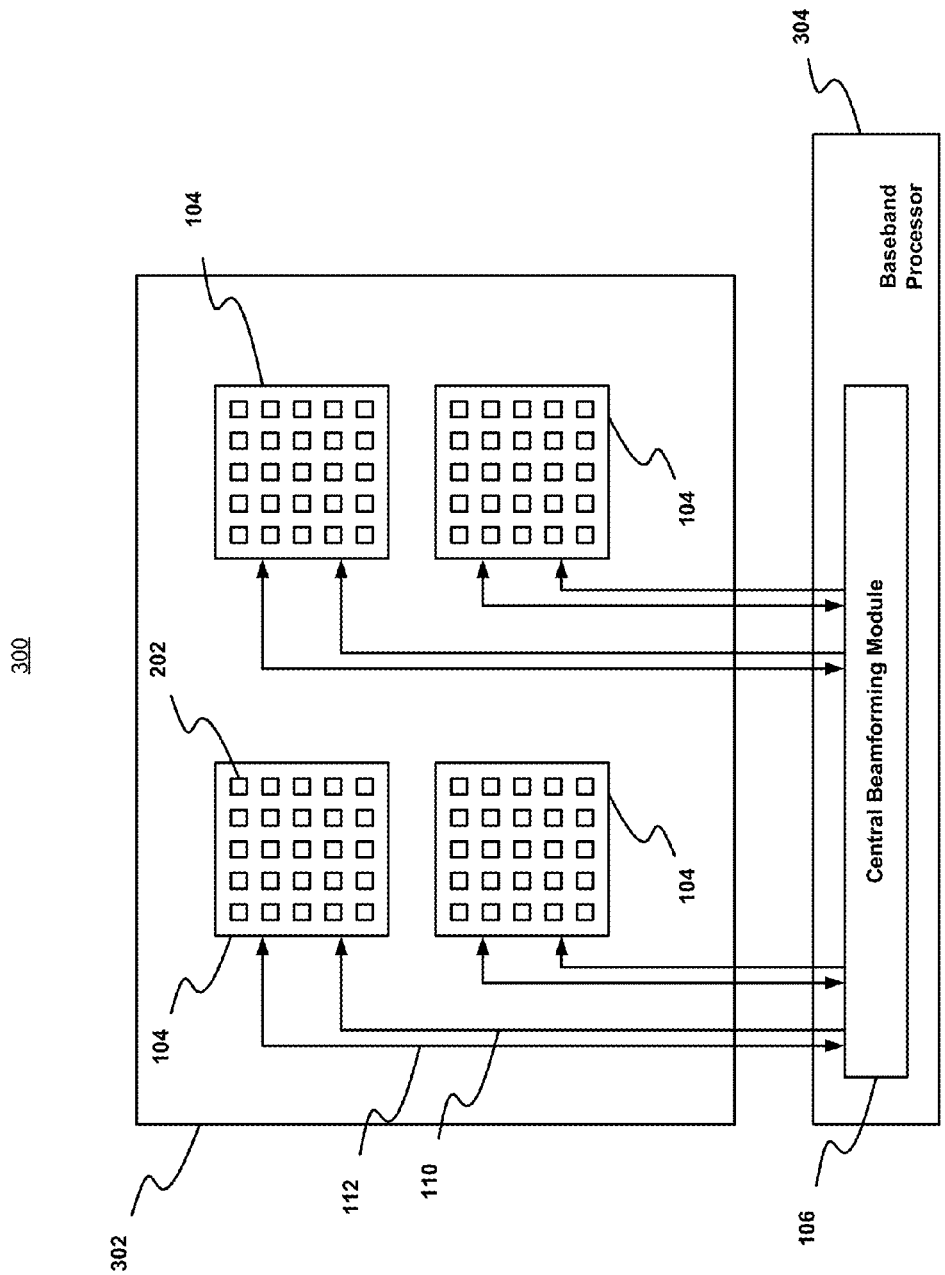
FIG. 3 illustrates a block diagram of another exemplary embodiment consistent with the present disclosure.

FIG. 3 illustrates a block diagram 300 of another exemplary embodiment consistent with the present disclosure. A baseband processor 304, which includes central beamforming module 106, is shown coupled to a planar array 302 of RF beamforming antenna modules 104 through data links 112 and control links 110. This example configuration, of a planar array, may be particularly advantageous for beam steering in two dimensions (e.g., azimuth and elevation).

Although only four RF beamforming antenna modules 104 are shown for simplicity, any number of such modules 104 may be employed to increase overall antenna gain and capability. Since the RF beamforming antenna modules 104 are coupled through data links 112 that may operate at lower frequencies (e.g., baseband or IF), the length of the data link signal routing is not constrained to the same extent as the feed lines for antenna elements 202, which limits the number of antenna elements 202 in a given module array. For example, a typical antenna array RFIC may be limited to an array size of 8×8 antenna elements 202 that are capable of providing an antenna beam gain of 15-20 dB. Communications in the mm-wave region, however, may require antenna gains on the order of 30-40 dB to compensate for the higher signal attenuation associated with that frequency range. Such gains may be achieved by employing additional RF beamforming antenna modules 104.

Figure 4:
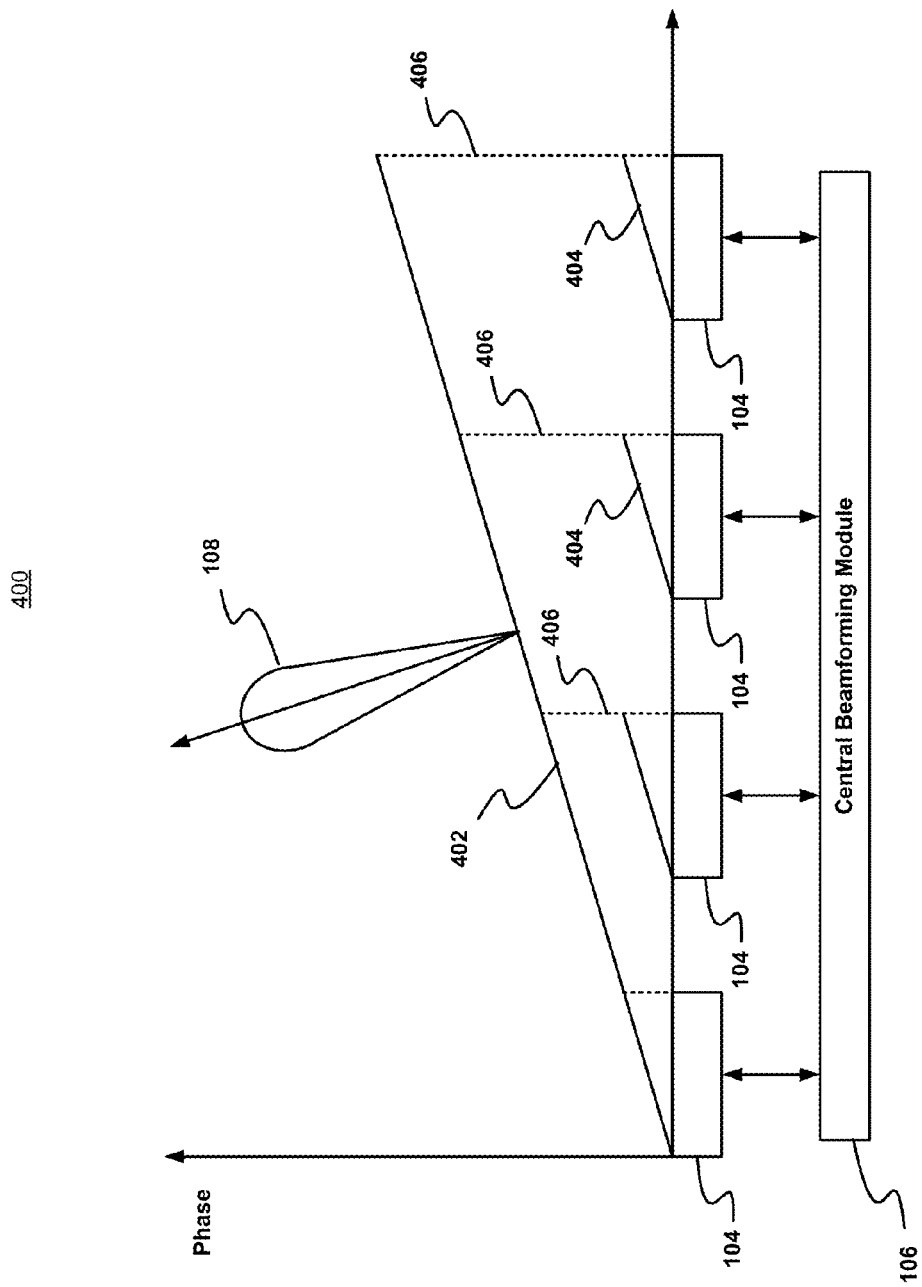
FIG. 4 illustrates exemplary phase adjustments consistent with an embodiment of the present disclosure.

FIG. 4 illustrates exemplary phase adjustments 400 consistent with an embodiment of the present disclosure. In this illustration the antenna beam 108 is steered in the indicated direction. RF beamforming antenna modules 104 are configured in a linear array and each module 104 may perform a local phase adjustment to the signal to create a local phase distribution 404 in the desired beam direction. Central beamforming module 106 may provide additional inter-module phase adjustments 406 to create a desired composite phase distribution 402 such that the signal phases across the antenna elements of the RF beamforming antenna modules 104 are aligned to create a composite antenna array having greater gain.

Figure 5:
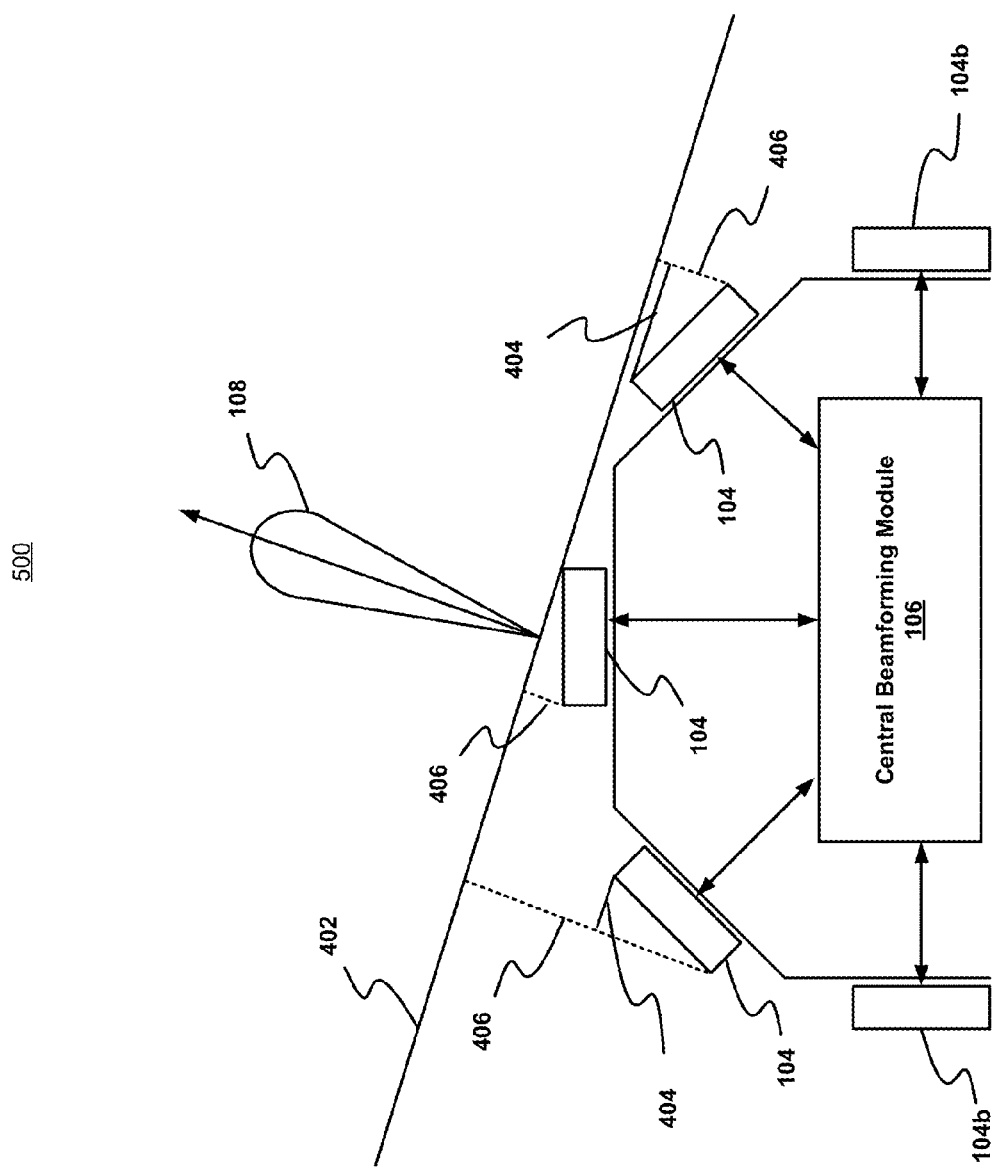
FIG. 5 illustrates exemplary phase adjustments consistent with another embodiment of the present disclosure.

FIG. 5 illustrates exemplary phase adjustments 500 consistent with another embodiment of the present disclosure. This illustration is similar to that of FIG. 4, however the RF beamforming antenna modules 104 are configured in a circular array, only half of which is shown for simplicity. The antenna beam 108 is steered in the indicated direction and RF beamforming antenna modules 104 may perform a local phase adjustment to the signal to create local phase distributions 404 in the desired beam direction. Here again, central beamforming module 106 may provide additional inter-module phase adjustments 406 to create a desired composite phase distribution 402 such that the signal phases across the antenna elements of the RF beamforming antenna modules 104 are aligned to create a composite antenna array having greater gain. In some embodiments, RF beamforming antenna modules 104b, which are physically oriented in a direction away from the desired beam direction 108, may be controlled by central beamforming module 106 such that they are switched off or employed for another purpose.

Figure 6:
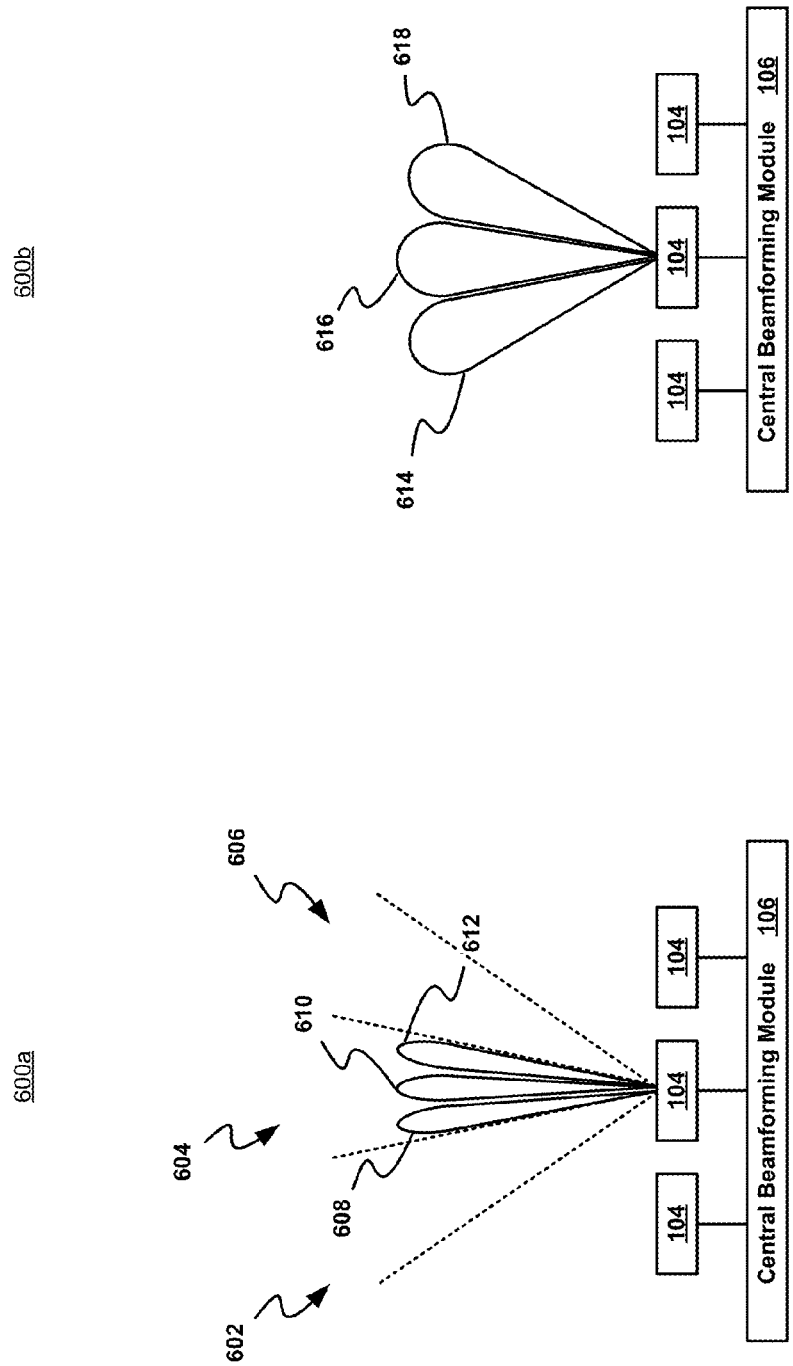
FIG. 6 illustrates exemplary beam forming consistent with an embodiment of the present disclosure.

FIG. 6 illustrates exemplary beam forming 600a and 600b consistent with an embodiment of the present disclosure. Shown are side views of the composite antenna array with beams pointing upward out of the plane of the array. The antenna aperture of the composite antenna array may increase in linear proportion to the number of sub-arrays (e.g., RF beamforming antenna modules 104) being employed. A larger antenna aperture is associated with a narrower beam width and higher gain. The dashed lines of 600a indicate example sectors 602, 604 and 606 that are associated with possible beam directions and beam widths that may be synthesized with each of the three individual sub-arrays 104. A composite array, formed from the three sub-arrays, may be capable of generating a beamwidth that is 3 times narrower and which may be scanned within a sector 608, 610, 612. The scanning may be accomplished through adjustment of the inter-module phasing, for example, by adjustment of the weighting coefficients provided by central beamforming module 106.

In an alternative embodiment 600b, the composite antenna array may be configured to receive or transmit signals throughout a wide sector that is a combination of individual sectors 614, 616 and 618, each generated by one of the sub-arrays 104. In this case, each sub-array 104 is configured to cover a different sector and central beamforming module 106 sums the sectors together. This may be useful, for example, when it is desirable to broadcast a signal over a wide area. Additional inter-module phase adjustments may be provided by central beamforming module 106 to generate quasi-spherical (or quasi-cylindrical) phase distribution across the composite antenna to generate a smoother antenna pattern.

Figure 7:
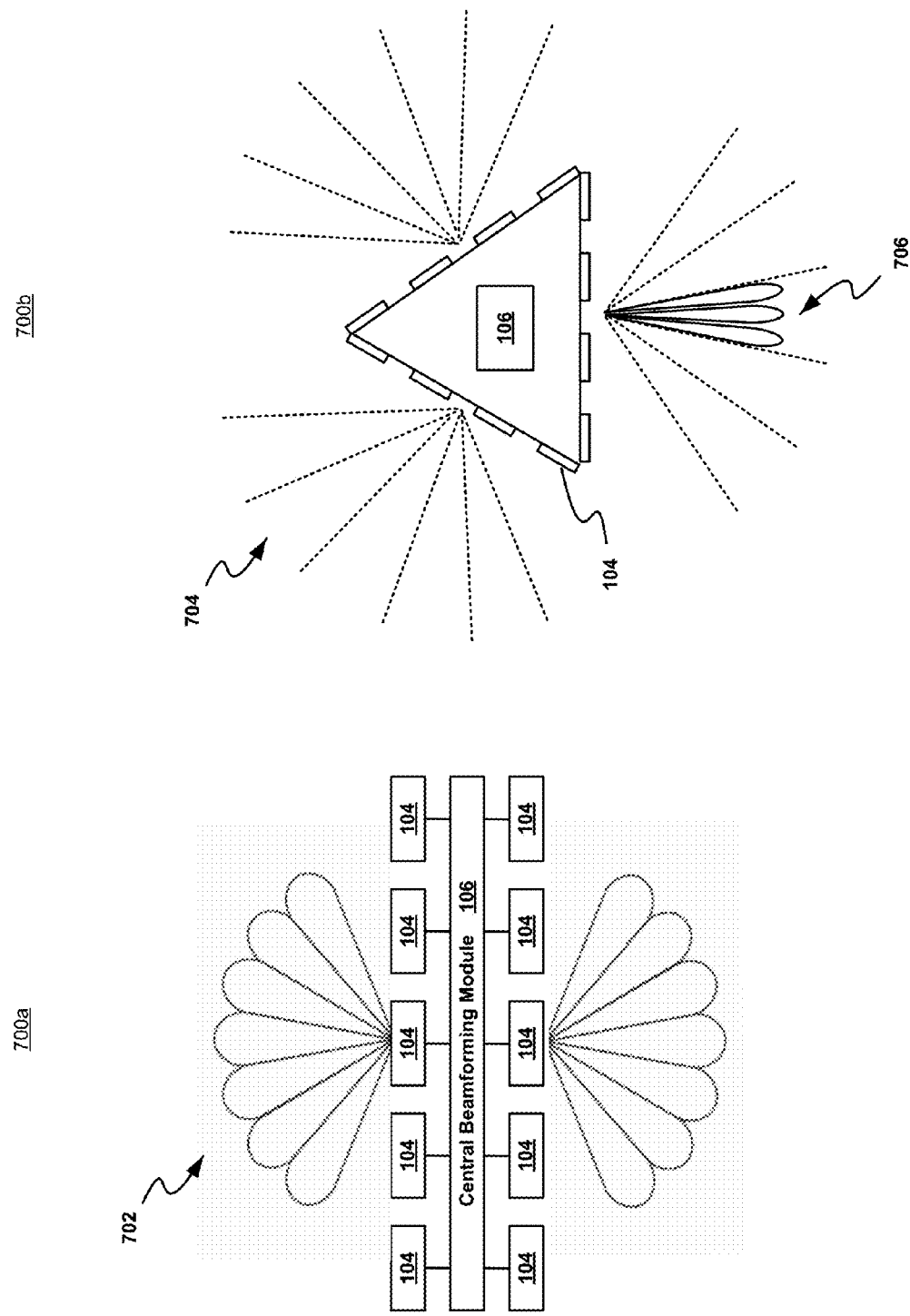
FIG. 7 illustrates exemplary beam forming consistent with another embodiment of the present disclosure.

FIG. 7 illustrates exemplary beam forming 700a and 700b consistent with another embodiment of the present disclosure. Shown are alternative configuration and form factors for the composite antenna array. A substantially spherical (or cylindrical) 360-degree pattern 702 may be achieved with parallel planes of sub-arrays 104 directed in opposite directions. A triangular arrangement 704 may also be employed to provide an omni-directional coverage mode. Additionally, and as previously described, narrow beams 706 may be steered through any of the sectors. Changes in beam-steering and/or coverage may be accomplished by updating weighting coefficients resulting in increased speeds for mode switching and beam steering.

Figure 8:
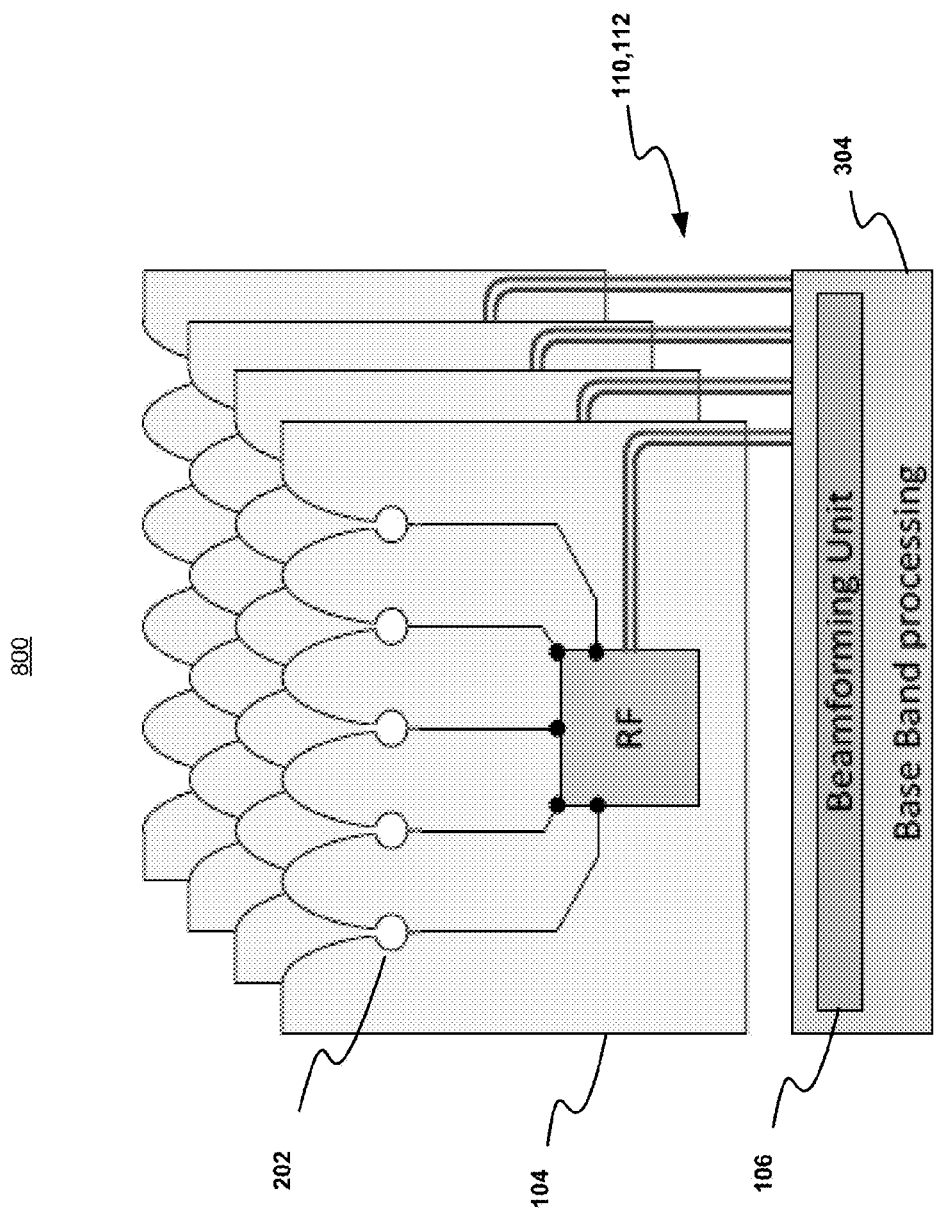
FIG. 8 illustrates a block diagram of another exemplary embodiment consistent with the present disclosure.

FIG. 8 illustrates a block diagram 800 of another exemplary embodiment consistent with the present disclosure. An alternative configuration is shown with sub-array modules 104 including end-fire antenna elements 202. This may provide a greater density of antenna elements since they are arranged linearly, rather than over a planar area, and it enables the stacking of sub-array modules 104 as shown.

The use of a composite antenna array enables an increase in signal transmission power through the deployment of an increased number of sub-array modules as opposed to an increase in the size of the power amplifier on each sub-array module. This permits a relaxation in the power level and linearity requirements of the power amplifiers and thus a relaxation in the manufacturing technology requirements of the RFIC modules. In some embodiments, therefore, the RFIC modules may be implemented in complementary metal-oxide semiconductor (CMOS) technology with a reduction in manufacturing cost.

Figure 9:
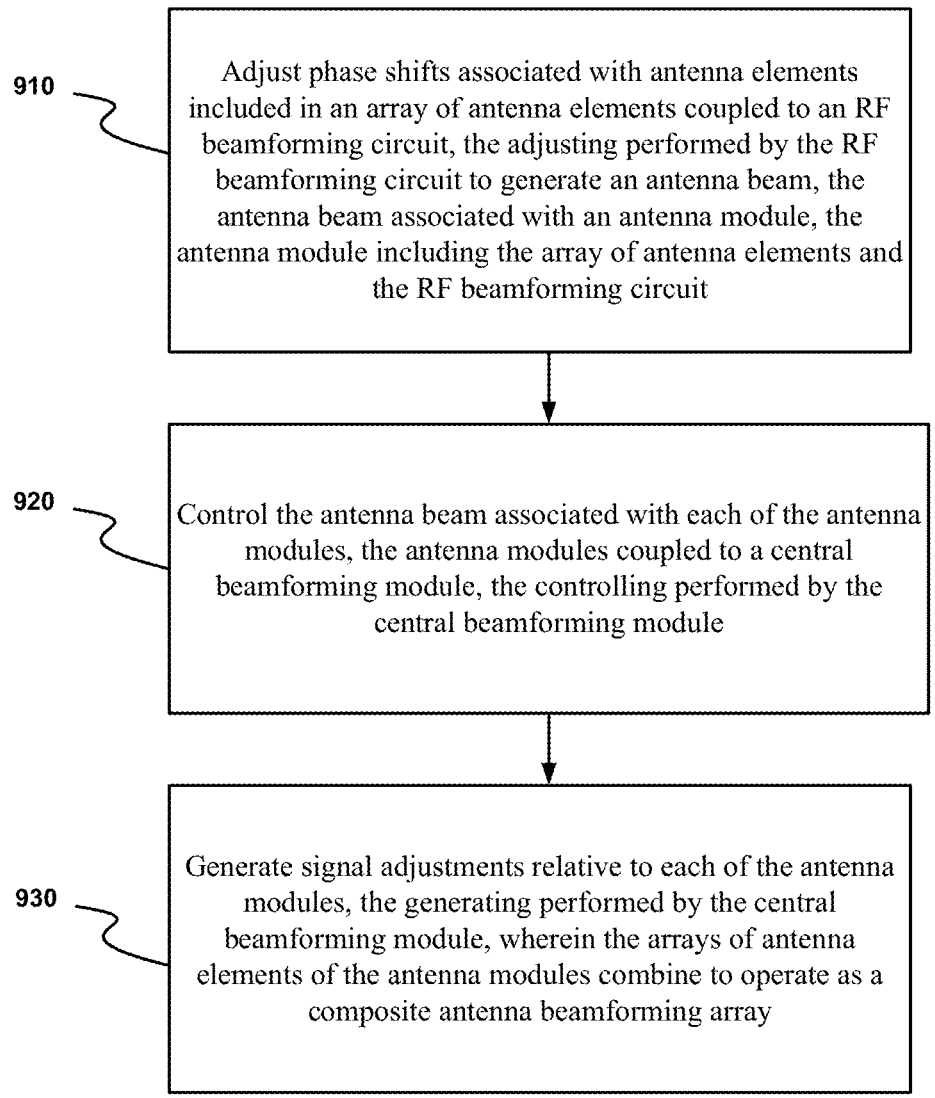
FIG. 9 illustrates a flowchart of operations of an exemplary embodiment consistent with the present disclosure.

FIG. 9 illustrates a flowchart of operations 900 of an exemplary embodiment consistent with the present disclosure. At operation 910, phase shifts associated with antenna elements are adjusted. The antenna elements are included in an array of antenna elements coupled to an RF beamforming circuit. The adjustments are performed by the RF beamforming circuit to generate an antenna beam associated with an antenna module. The antenna module includes the array of antenna elements and the RF beamforming circuit. At operation 920, a central beamforming module is coupled to a plurality of the antenna modules. At operation 920, the antenna beam associated with each of a plurality of antenna modules, coupled to a central beamforming module, is controlled by the central beamforming module. At operation 930, signal adjustments relative to each of the antenna modules are generated. The generating is performed by the central beamforming module, such that the arrays of antenna elements of the antenna modules combine to operate as a composite antenna beamforming array.

Figure 10:
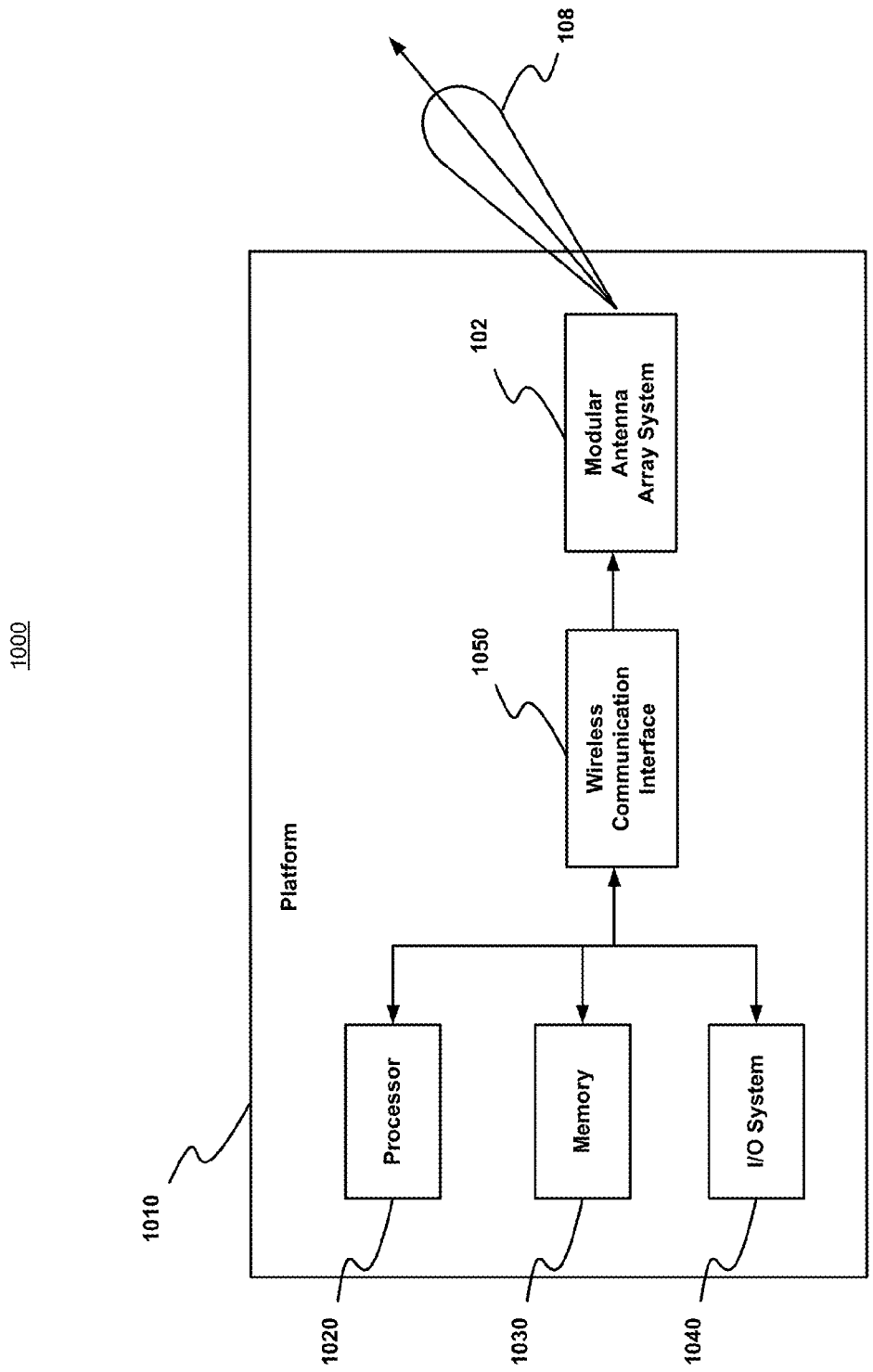
FIG. 10 illustrates a platform of one exemplary embodiment consistent with the present disclosure.

FIG. 10 illustrates a system diagram 1000 of a platform consistent with an exemplary embodiment of the present disclosure. Platform 110 may be a mobile communication device, such as, for example, a smartphone, a tablet, a laptop computing device or any other device configured to transmit or receive wireless signals. In some embodiments, platform 1010 may be a wireless base station. Platform 1010 may include a processor 1020, memory 1030, an input/output (I/O) system 1040, a wireless communication interface 1050 and a modular antenna array system 102. The modular antenna array system 102 may be configured to generate an antenna beam pattern 108 in a desired direction as described previously. Any number of platforms 1010 may transmit or receive signals through a wireless network or any suitable communication medium.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, methods and platforms for antenna array beamforming using a modular architecture to synthesize larger composite antenna arrays from smaller sub-array antenna modules.

The system may include a plurality of antenna modules, each of the antenna modules including an array of antenna elements coupled to an RF beamforming circuit, the RF beamforming circuit configured to adjust phase shifts associated with each of the antenna elements to generate an antenna beam associated with the antenna module. The system of this example may also include a central beamforming module coupled to each of the antenna modules, the central beamforming module configured to control the antenna beam associated with each of the antenna modules and to generate signal adjustments relative to each of the antenna modules, and the arrays of antenna elements of the antenna modules combine to operate as a composite antenna beamforming array.

Another example system includes the forgoing components and the signal adjustments include signal magnitude adjustments and signal phase adjustments.

Another example system includes the forgoing components and the central beamforming module is a baseband processor, an intermediate frequency processor and/or an RF processor.

Another example system includes the forgoing components and the central beamforming module is further configured to control the composite antenna beamforming array to generate a composite antenna beam, the composite antenna beam having a higher gain and narrower beamwidth than the antenna beams associated with the antenna modules.

Another example system includes the forgoing components and the central beamforming module is further configured to control the composite antenna beamforming array to generate a composite antenna beam, the composite antenna beam having a wider beamwidth than the antenna beams associated with the antenna modules.

Another example system includes the forgoing components and the central beamforming module is further configured to control the composite antenna beamforming array to generate a composite antenna beam and to steer the composite antenna beam from a first direction to a second direction.

Another example system includes the forgoing components and the central beamforming module is further configured to segment the composite antenna beamforming array into a plurality of composite sub-arrays, each composite sub-array configured to generate an independently steerable antenna beam.

Another example system includes the forgoing components and the central beamforming module is further configured to apply a plurality of signal adjustments, each of the signal adjustments associated with one of a plurality of signal frequency components.

Another example system includes the forgoing components and the antenna modules are disposed in one or more planes, the planes oriented in different directions relative to each other.

Another example system includes the forgoing components and the antenna elements and the antenna modules are arranged in a linear end-fire pattern.

Another example system includes the forgoing components and the RF beamforming circuits are RFICs and the antenna modules are configured to operate in a millimeter wave frequency range.

Another example system includes the forgoing components and the antenna elements are coupled to the RF beamforming circuit by micro-strip feeding lines.

According to another aspect there is provided a method. The method may include coupling an array of antenna elements to an RF beamforming circuit. The method of this example may also include adjusting phase shifts associated with each of the antenna elements, the adjusting performed by the RF beamforming circuit to generate an antenna beam, the antenna beam associated with an antenna module, the antenna module including the array of antenna elements and the RF beamforming circuit. The method of this example may further include coupling a central beamforming module to a plurality of the antenna modules. The method of this example may further include controlling the antenna beam associated with each of the antenna modules, the controlling performed by the central beamforming module. The method of this example may further include generating signal adjustments relative to each of the antenna modules, the generating performed by the central beamforming module, and the arrays of antenna elements of the antenna modules combine to operate as a composite antenna beamforming array.

Another example method includes the forgoing operations and the signal adjustments include signal magnitude adjustments and signal phase adjustments.

Another example method includes the forgoing operations and further includes controlling the composite antenna beamforming array to generate a composite antenna beam, the composite antenna beam having a higher gain and narrower beamwidth than the antenna beams associated with the antenna modules.

Another example method includes the forgoing operations and further includes controlling the composite antenna beamforming array to generate a composite antenna beam, the composite antenna beam having a wider beamwidth than the antenna beams associated with the antenna modules.

Another example method includes the forgoing operations and further includes controlling the composite antenna beamforming array to generate a composite antenna beam and to steer the composite antenna beam from a first direction to a second direction.

Another example method includes the forgoing operations and further includes segmenting the composite antenna beamforming array into a plurality of composite sub-arrays, each composite sub-array configured to generate an independently steerable antenna beam.

Another example method includes the forgoing operations and further includes applying a plurality of signal adjustments, each of the signal adjustments associated with one of a plurality of signal frequency components.

Another example method includes the forgoing operations and further includes disposing the antenna modules in one or more planes and orienting the planes in different directions relative to each other.

Another example method includes the forgoing operations and further includes arranging the antenna elements and the antenna modules in a linear end-fire pattern.

According to another aspect there is provided a platform. The platform may include a processor; an input/output module coupled to the processor; a memory coupled to the processor; and a wireless communication interface coupled to the processor. The wireless communication interface of this example may include a plurality of antenna modules, each of the antenna modules including an array of antenna elements coupled to an RF beamforming circuit, the RF beamforming circuit configured to adjust phase shifts associated with each of the antenna elements to generate an antenna beam associated with the antenna module. The wireless communication interface of this example may further include a central beamforming module coupled to each of the antenna modules, the central beamforming module configured to control the antenna beam associated with each of the antenna modules and to generate signal adjustments relative to each of the antenna modules, and the arrays of antenna elements of the antenna modules combine to operate as a composite antenna beamforming array.

Another example platform includes the forgoing components and the central beamforming module is further configured to control the composite antenna beamforming array to generate a composite antenna beam, the composite antenna beam having a higher gain and narrower beamwidth than the antenna beams associated with the antenna modules.

Another example platform includes the forgoing components and the central beamforming module is further configured to control the composite antenna beamforming array to generate a composite antenna beam, the composite antenna beam having a wider beamwidth than the antenna beams associated with the antenna modules.

Another example platform includes the forgoing components and the central beamforming module is further configured to control the composite antenna beamforming array to generate a composite antenna beam and to steer the composite antenna beam from a first direction to a second direction.

Another example platform includes the forgoing components and the central beamforming module is further configured to segment the composite antenna beamforming array into a plurality of composite sub-arrays, each composite sub-array configured to generate an independently steerable antenna beam.

Another example platform includes the forgoing components and the central beamforming module is further configured to apply a plurality of signal adjustments, each of the signal adjustments associated with one of a plurality of signal frequency components.

Another example platform includes the forgoing components and the antenna modules are disposed in one or more planes, the planes oriented in different directions relative to each other.

Another example platform includes the forgoing components and the antenna elements and the antenna modules are arranged in a linear end-fire pattern.

Another example platform includes the forgoing components and the RF beamforming circuits are RFICs and the antenna modules are configured to operate in a millimeter wave frequency range.

Another example platform includes the forgoing components and the platform is a smartphone, a laptop computing device or a tablet.

Another example platform includes the forgoing components and the platform is a wireless base station.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for antenna beamforming, said system comprising:
   at least one antenna comprising an array of antenna elements coupled to a radio frequency (RF) beamforming circuit, said RF beamforming circuit to adjust phase shifts associated with said antenna elements to generate a plurality of antenna beams, each of said antenna beams defining a corresponding sector having a sector beamwidth, wherein said plurality of sector beamwidths collectively define a wide sector, said wide sector having a wide sector beamwidth that is wider than a respective one of said sector beamwidths; and
   central beamforming circuitry coupled to said at least one antenna, said central beamforming circuitry to control said plurality of antenna beams such that said arrays of antenna elements of said at least one antenna combine to operate as a composite antenna beamforming array;
   wherein:
      said central beamforming circuitry is further configured to control said composite antenna beamforming array to generate a composite antenna beam comprising said plurality antenna beams, said composite antenna beam having a higher gain than each of said antenna beams associated with said antenna and a composite beamwidth that is narrower than said respective one of said sector beamwidths; and
      said antenna is configured to operate in a millimeter wave frequency range.

2. The system of claim 1, wherein said signal adjustments comprise signal magnitude adjustments and signal phase adjustments.

3. The system of claim 1, wherein said central beamforming circuitry is included in a processor selected from the group consisting of a baseband processor, an intermediate frequency processor and an RF processor.

4. The system of claim 1, wherein said central beamforming circuitry is configured to generate said composite antenna beam at least in part by applying phase adjustments such that signal phases across the array of antenna elements are aligned.

5. The system of claim 1, wherein said central beamforming circuitry is further configured to control said composite antenna beamforming array to generate said composite antenna beam with a wider beamwidth than said respective one of said sector beamwidths.

6. The system of claim 1, wherein said central beamforming circuitry is further configured to steer said composite antenna beam from a first direction to a second direction.

7. The system of claim 1, wherein said central beamforming circuitry is further configured to:
   segment said composite antenna beamforming array into a plurality of composite sub-arrays, wherein each composite sub-array comprises a plurality of said antennas; and
   to generate an independently steerable antenna beam with each of said plurality of composite sub-arrays.

8. The system of claim 1, wherein:
   said central beamforming circuitry is further configured to apply a plurality of said signal adjustments; and
   each of said plurality of signal adjustments corresponds to one of a plurality of signal frequency components.

9. The system of claim 1, wherein said antenna elements are disposed in a plurality of planes, said planes oriented in different directions relative to each other.

10. The system of claim 1, wherein said antenna elements and said antenna are arranged in a linear end-fire pattern.

11. The system of claim 1, wherein a gain of said composite antenna beam is at least about 30 dB.

12. The system of claim 1, wherein said plurality of antenna elements are coupled to said RF beamforming circuit by micro-strip feeding lines.

13. A method for antenna beamforming, comprising:
    generating a plurality of antenna beams, wherein each of said plurality antenna beams is produced by one of a plurality of antenna elements forming an array, each of said antenna beams define a corresponding sector having a sector beamwidth, wherein said plurality of sector beamwidths collectively define a wide sector, said wide sector having a wide sector beamwidth that is wider than a respective one of said sector beamwidths, wherein said plurality of antenna elements form at least one antenna and a radio frequency (RF) beamforming circuit is coupled to the plurality of antenna elements, said generating comprising adjusting, with the RF beamforming circuit, phase shifts associated with the plurality of antenna elements;
    controlling said plurality of antenna beams with central beamforming circuitry coupled to said plurality antenna elements; and
    generating and applying, with said central beamforming circuitry, signal adjustments for each of said antenna elements so as to cause said plurality of antenna elements to operate as a composite beamforming array to produce a composite antenna beam comprising said antenna beams, said composite antenna beam having a higher gain than said plurality of antenna beams and a composite beamwidth that is narrower than said respective one of said sector beamwidths;
    wherein said antenna elements are configured to operate in a millimeter wave frequency range.

14. The method of claim 13, wherein said signal adjustments comprise signal magnitude adjustments and signal phase adjustments.

15. The method of claim 13, wherein generating and applying said signal adjustments comprises applying phase adjustments such that signal phases across the array of antenna elements are aligned.

16. The method of claim 13, further comprising controlling, with said central beamforming circuitry, said composite antenna beamforming array so as to produce said composite antenna beam with a wider beamwidth than said respective one of said sector beamwidths.

17. The method of claim 13, further comprising steering said composite antenna beam from a first direction to a second direction.

18. The method of claim 13, further comprising:
segmenting said composite antenna beamforming array into a plurality of composite sub-arrays, each composite sub-array comprising a plurality of said antennas; and
generating an independently steerable antenna beam with each of said plurality of composite sub-arrays.

19. The method of claim 13, further comprising:
applying a plurality of said signal adjustments with said central beamforming circuitry, wherein each of said plurality of signal adjustments corresponds to one of a plurality of signal frequency components.

20. The method of claim 13, wherein said plurality of antenna elements are disposed in a plurality of planes and oriented in different directions relative to each other.

21. The method of claim 13, wherein a gain of said composite antenna beam is at least about 30 dB.

22. A platform comprising:
a processor;
input/output circuitry coupled to said processor;
a memory coupled to said processor; and
a wireless communication interface coupled to said processor, said interface comprising:
at least one antenna comprising an array of antenna elements coupled to a radio frequency (RF) beamforming circuit, said RF beamforming circuit to adjust phase shifts associated with said antenna elements to generate a plurality of antenna beams, each of said antenna beams defining a corresponding sector having a sector beamwidth, wherein said plurality of sector beamwidths collectively define a wide sector, said wide sector having a wide sector beamwidth that is wider than a respective one of said sector beamwidths; and
central beamforming circuitry coupled to said at least one antenna, said central beamforming circuitry to control said plurality of antenna beams such that said arrays of antenna elements of said at least one antenna combine to operate as a composite antenna beamforming array;
wherein:
said central beamforming circuitry is further configured to control said composite antenna beamforming array to generate a composite antenna beam comprising said plurality antenna beams, said composite antenna beam having a higher gain than each of said antenna beams associated with said antenna and a composite beamwidth that is narrower than a respective one of said respective one of said sector beamwidths; and
said antenna is configured to operate in a millimeter wave frequency range.

23. The platform of claim 22, wherein said central beamforming circuitry is configured to generate said composite antenna beam at least in part by applying phase adjustments such that signal phases across the array of antenna elements are aligned.

24. The platform of claim 22, wherein said central beamforming circuitry is further configured to control said composite antenna beamforming array to generate said composite antenna beam with a wider beamwidth than said respective one of said sector beamwidths.

25. The platform of claim 22, wherein said central beamforming circuitry is further configured to steer said composite antenna beam from a first direction to a second direction.

26. The platform of claim 22, wherein said central beamforming circuitry is further configured to:
segment said composite antenna beamforming array into a plurality of composite sub-arrays, wherein each composite sub-array comprises a plurality of said antennas; and
to generate an independently steerable antenna beam with each of said plurality of composite sub-arrays.

27. The platform of claim 22, wherein:
said central beamforming circuitry is further configured to apply a plurality of said signal adjustments; and
each of said plurality of signal adjustments corresponds to one of a plurality of signal frequency components.

28. The platform of claim 22, wherein said antenna elements are disposed in a plurality of planes, said planes oriented in different directions relative to each other.

29. The platform of claim 22, wherein said antenna elements and said antenna are arranged in a linear end-fire pattern.

30. The platform of claim 22, wherein a gain of said composite antenna beam is at least about 30 dB.

31. The platform of claim 22, wherein said platform is selected from the group consisting of a smartphone, a laptop computing device and a tablet.

32. The platform of claim 22, wherein said platform is a wireless base station.

* * * * *